United States Patent
Lin

(10) Patent No.: US 9,854,403 B2
(45) Date of Patent: Dec. 26, 2017

(54) GUIDING SYSTEM FOR POSITIONING TARGET OBJECT

(71) Applicant: Yu-Shun Lin, Taipei (TW)

(72) Inventor: Yu-Shun Lin, Taipei (TW)

(73) Assignee: LINCTRONIX LTD., New Taipei (TW)

( * ) Notice: Subject to any disclaimer, the term of this patent is extended or adjusted under 35 U.S.C. 154(b) by 0 days.

(21) Appl. No.: 15/451,443

(22) Filed: Mar. 7, 2017

(65) Prior Publication Data

US 2017/0265038 A1    Sep. 14, 2017

(30) Foreign Application Priority Data

Mar. 9, 2016 (TW) .............................. 105107195 A

(51) Int. Cl.
*H04W 24/00* (2009.01)
*H04W 4/02* (2009.01)
*H04B 17/318* (2015.01)
*H04W 48/10* (2009.01)
*H04W 4/00* (2009.01)

(52) U.S. Cl.
CPC .......... *H04W 4/023* (2013.01); *H04B 17/318* (2015.01); *H04W 4/008* (2013.01); *H04W 48/10* (2013.01)

(58) Field of Classification Search
CPC ..... H04W 4/023; H04W 4/008; H04W 48/10; H04B 17/318
USPC ...................................................... 455/456.3
See application file for complete search history.

(56) References Cited

U.S. PATENT DOCUMENTS

| 8,644,843 | B2* | 2/2014 | Canon | G01S 5/02 455/456.1 |
|---|---|---|---|---|
| 9,412,278 | B1* | 8/2016 | Gong | H04L 63/101 |
| 9,629,104 | B2* | 4/2017 | Gibbon | H04W 52/30 |
| 2014/0146697 | A1* | 5/2014 | Kim | H04B 7/0413 370/252 |
| 2016/0183057 | A1* | 6/2016 | Steiner | H04W 4/027 455/456.1 |
| 2017/0188257 | A1* | 6/2017 | Gibbon | H04W 28/0221 |

OTHER PUBLICATIONS

Algorithms for Location Estimation Based on RSSI Sampling. Approximation Algorithms for Facility Location Problems (Lecture Notes).

* cited by examiner

*Primary Examiner* — Marceau Milord

(57) ABSTRACT

A guiding system for positioning a target object, which is capable of guiding a user of a mobile device to the position of the target object comprises an wireless positioning device configured on the target object, a plurality of base stations configured around the target object, a positioning server, and an application software built in the mobile device. The wireless positioning device sends wireless broadcasting signal to the base stations. The base stations measure the intensities of broadcasting signal and then send the broadcasting signal and the intensities to the positioning server. The positioning server calculates a locating area of the target object according to the broadcasting signal and the intensities, and then sends the locating area to the mobile device. The application software displays the locating area of the target object to guide the user of the mobile device to the locating area.

8 Claims, 2 Drawing Sheets

GUIDING SYSTEM FOR POSITIONING TARGET OBJECT

BACKGROUND OF THE INVENTION

Field of the Invention

The present invention relates to an object positioning and guidance system, more particularly, to an object positioning and guidance system that guides a user closed to a target object using a positioning technique and then explicitly marks an article distance using a wireless positioning signal to guide a user to find the object.

Description of the Prior

The positioning algorithm is used for target position detection to calculate the actual position, in order to accurately calculate the correct position, it is necessary to deploy a wireless base station at a high density around a target object or to use a specific spectrum. However, the above method has some problem such as high cost, difficulty to implement, and problem of being easily influenced by terrain, thereby resulting in unpopularity of this positioning technology. In contrast, the micro-positioning of the Bluetooth transmission technology needs to be close to a certain distance in order to take effect. Therefore, Bluetooth micro-positioning technology does not meet the needs of most conditions, so that the technology also cannot be universal.

Thus, the above-mentioned conventional technology still has a lot of missing, and it is not a good designer, therefore it needs to be improved.

SUMMARY OF THE INVENTION

Therefore, the present inventor with many years engaged in the manufacture and development of related products and design experience went through the detailed design and careful assessment to finally confirm that the present invention is practically usable.

A primary object of the present invention is to provide a guiding system for positing a target object for guiding a user of a mobile device to a position of a target object. The system first detects the wireless positioning device configured to the target and sending the wireless broadcasting signal. The plurality of surrounding wireless base stations receiving the wireless broadcasting signal and determines the Received Signal Strength Indication (RSSI). The plurality of wireless base stations sends the RSSI to the positioning server. The positioning server calculates the positioning area of the target according to the positioning algorithm and transmits the positioning area to the mobile device. When the mobile device is close to the target position to receive the wireless broadcasting signal sent by the wireless positioning device on the target, the mobile device can calculate the distance between the mobile device and the target object according to the first RSSI to guide the user of the mobile device to the exact location of the target object.

In order to achieve the above object, the precise positioning and guidance system of the present invention mainly comprises a wireless positioning device, a plurality of wireless base stations, a positioning server, and an application software. The wireless positioning device is configured on the target, and transmits the wireless broadcasting signal regularly. A plurality of wireless base stations are disposed around the target, when the wireless base station receives the wireless broadcasting signal the wireless base station calculates the RSSI of the wireless broadcasting signal, and the wireless broadcasting signal and the RSSI are sent to the positioning server. The positioning server calculates the positioning area of the object by the positioning algorithm and sends the positioning area to the mobile device, and the application software displays the positioning area of the object on the mobile device guiding the mobile device to the area where the object is located. When the mobile device is close to the target position to receive the wireless broadcasting signal sent by the wireless positioning device on the target, the mobile device can calculate the distance between the mobile device and the target object according to the RSSI to guide the user of the mobile device to the exact location of the target object.

The advantages and spirits of the invention can be understood by the following recitations together with the appended drawings.

BRIEF DESCRIPTION OF THE APPENDED DRAWINGS

DETAILED DESCRIPTION OF THE INVENTION

A detailed description of the hereinafter described embodiments of the disclosed apparatus and method are presented herein by way of exemplification and not limitation with reference to the Figures. Although certain embodiments are shown and described in detail, it should be understood that various changes and modifications can be made without departing from the scope of the appended claims. The scope of the present invention will in no way be limited to the number of constituting components, the materials thereof, the shapes thereof, the relative arrangement thereof, etc., and are disclosed simply as an example of embodiments of the present invention.

Figure 1:
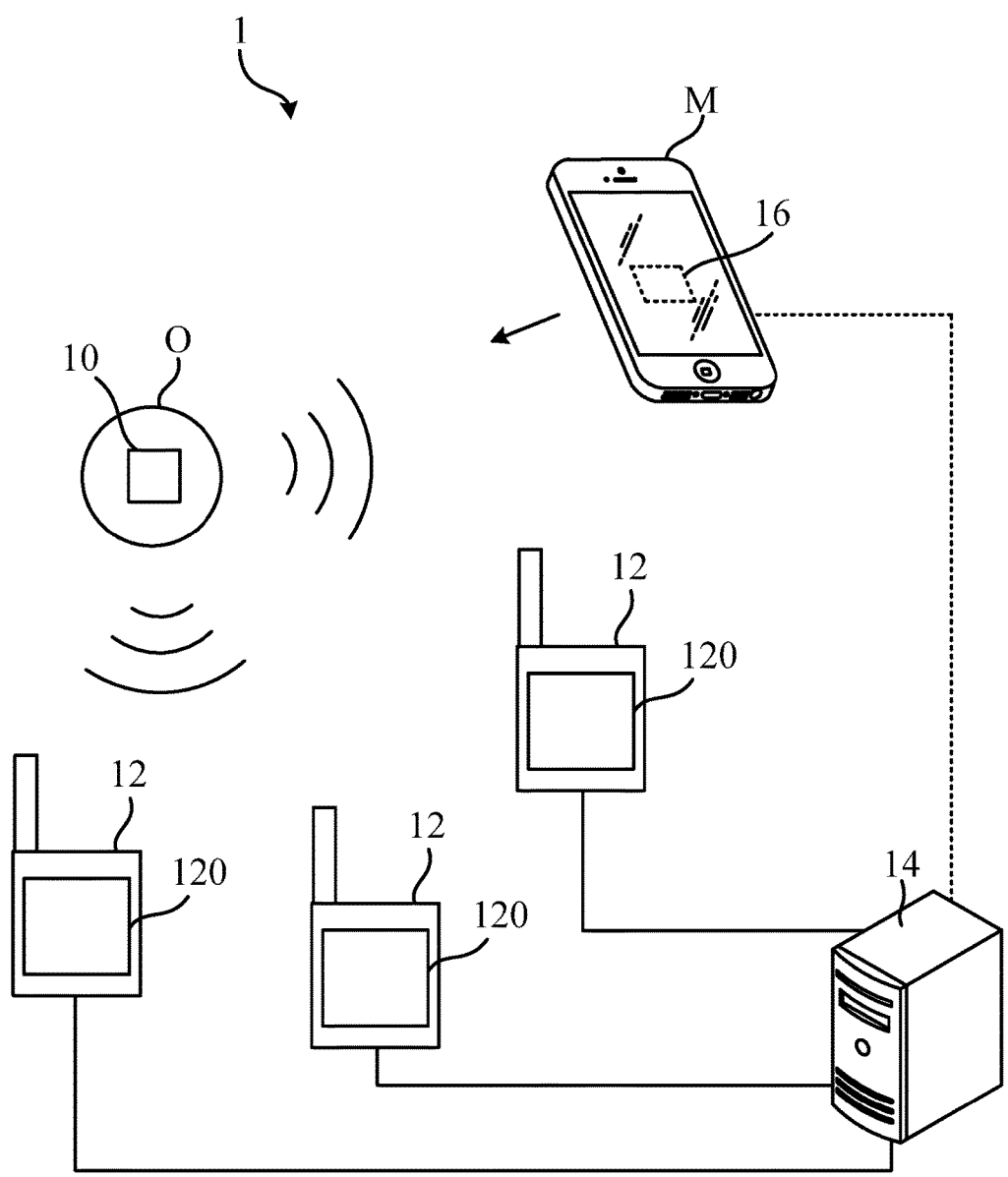
FIG. 1 shows a schematic diagram of the guiding system for positioning a target object in an embodiment of the present invention.

Please refer to FIG. 1. FIG. 1 shows a schematic diagram of the guiding system for positioning a target object in an embodiment of the present invention. As shown in FIG. 1, the guiding system for positing a target object 1 comprises a wireless positioning device 10, more than one wireless base station 12, a positioning server 14, and an application software 16 built on the mobile device M. The wireless positioning device 10 is configured on the target object O and can send a wireless broadcasting signal, while the wireless base stations 12 are disposed in the range of the wireless broadcasting signal and around the target object O. The wireless base stations 12 comprises the wireless module 120, and the wireless module 120 can receive the wireless broadcasting signal sent by the wireless positioning device 10. In an embodiment of the present invention, the wireless broadcasting signal sent by the wireless positioning device 10 comprises the unique identifier of the wireless positioning device 10.

The wireless positioning device 10 disposed on the target can employ a relatively short distance wireless transmission technology, such as a Bluetooth transmission technology. In an embodiment of the present invention, the wireless positioning device 10 can be a Bluetooth pointing device, wherein the Bluetooth pointing device provides a Bluetooth module for sending a Bluetooth broadcasting signal. Relatively, the wireless module 120 of the wireless base station 12 can also be a Bluetooth module to receive the Bluetooth broadcasting signal sending by the wireless positioning device 10. Moreover, the mobile device M can also provide a Bluetooth module to receive the Bluetooth broadcasting signal by the wireless positioning device 10, when the mobile device M is in the range of the wireless positioning device 10. The Bluetooth modules within each of the above-described devices can be any Bluetooth protocol defined by the Bluetooth Association, such as a variety of Bluetooth devices with Bluetooth 2.0 protocol, Bluetooth 3.0 protocol, or Bluetooth 4.0 protocol. In practice, the wireless base station 12 can be provided with a network communication module in order to establish a network connection with the positioning server 14, in addition to providing the wireless module 120 for receiving the wireless broadcasting signal sending by the wireless positioning device 10. Moreover, the mobile device M can comprise a processor for executing the application software 16 on the mobile device M and the wireless network module to establish an internet connection with the positioning server 14, in addition to the Bluetooth module. The wireless network module of the mobile device M can be a wireless mobile communication module or a wireless local area network module in practice. The wireless network module and the network communication module comprised in the mobile device M and the wireless base station 12 can be an Ethernet, a very-high-bit-rate digital subscriber line (VDSL), an asymmetric digital subscriber line (ADSL), WiFi wireless local area network or wireless mobile communication module.

The wireless positioning device 10 can periodically sends a wireless broadcasting signal, and the surrounding wireless base station 12 can receive the wireless broadcasting signal. After receiving the wireless broadcasting signal, each wireless base station 12 determines the Received Signal Strength Indication (RSSI) and sends the RSSI to the positioning server 14 via a network connection with the positioning server 14. The positioning server 14 calculates a positioning area of the target object O of the wireless positioning device 10 by the positioning algorithm via one or more RSSI sent from each of the wireless base stations 12 and the fixed positions of the wireless base stations 12. In practice, the fixed position of each wireless base station 12 can be recorded directly in the positioning server 14.

In the present invention, the mobile device M can further establish an internet connection with the positioning server 14 via the wireless network module, and the positioning server 14 can send the calculated positioning area of the object O to the mobile device M via the Internet. The application software 16 in the mobile device M can control the display of the mobile device M to display the positioning area in which the object O is located so that the user of the mobile device M can be guided to the positioning area. When the mobile device M enters the signal range of any wireless base stations 12, the mobile device M establishes a first wireless network connections with the wireless base station 12, and the positioning server 14 calculates a distance between the mobile device M and the wireless base station 12 via the RSSI of the first wireless network connection and calculates a current position of the mobile device M according to the distance and the fixed positions of the wireless base stations 12.

Next, the positioning server 14 calculates one or more paths from the mobile device M to the target object O according to the current position of the mobile device 12 and the positioning area of the target object O. The positioning server 14 sends the path information back to the mobile device M via the Internet. Alternatively, the positioning server 14 sends the path information to the wireless base stations 12 via a network, and then the wireless base stations 12 send the path information to the mobile device M via the first wireless network. When the mobile device M receives the path information, the application software 16 displays the path information on the screen of the mobile device M.

Next, when the user moves to close the target object O to receive the wireless broadcasting signal of the positioning device 10 according to the path information of the mobile device M. The mobile device M can read the RSSI after receiving the wireless broadcasting signal sent from the positioning device 10, and the application software 16 determines the distance from the target object O by the RSSI. The path information and the distance displayed on the display of the mobile device, and to guides the user of the mobile device to the target. In another embodiment of the present invention, when the mobile device M closes one or more of the wireless base stations 12, it can receive one or more identification wireless broadcasting signal sent by the wireless base stations 12. These identification wireless broadcasting signals comprise the unique device identifier of the corresponding wireless base station 12. The mobile device M reads one or more RSSI after receiving the identification wireless broadcasting signals and sends the identification wireless broadcasting signals of the RSSI and the unique device identifier of the wireless base station 12 to the positioning server 14 via the Internet connection of the mobile device M and the positioning server 14. The positioning server 14 uses the unique device identifier of the wireless base station 12 and identification wireless broadcasting signals of the RSSI to determine the distance between the mobile device M and the wireless base station 12 which closed and used the positioning algorithm to calculate a current position of the mobile device M according to the distance and the fixed positions of the wireless base stations 12.

In the embodiment of the present invention, the positioning server 14 calculates one or more paths from the mobile device 12 to the target object O according to the current position of the mobile device 12 and sends the path information to the mobile device M via the Internet connection. Alternatively, the positioning server 14 sends the path information to the wireless base stations 12 via a network connection with the wireless base stations 12 and then sends the path information to the mobile device M via the wireless base stations 12. When the mobile device M receives the path information, the application software 16 displays the path information on the screen of the mobile device M.

Figure 2:
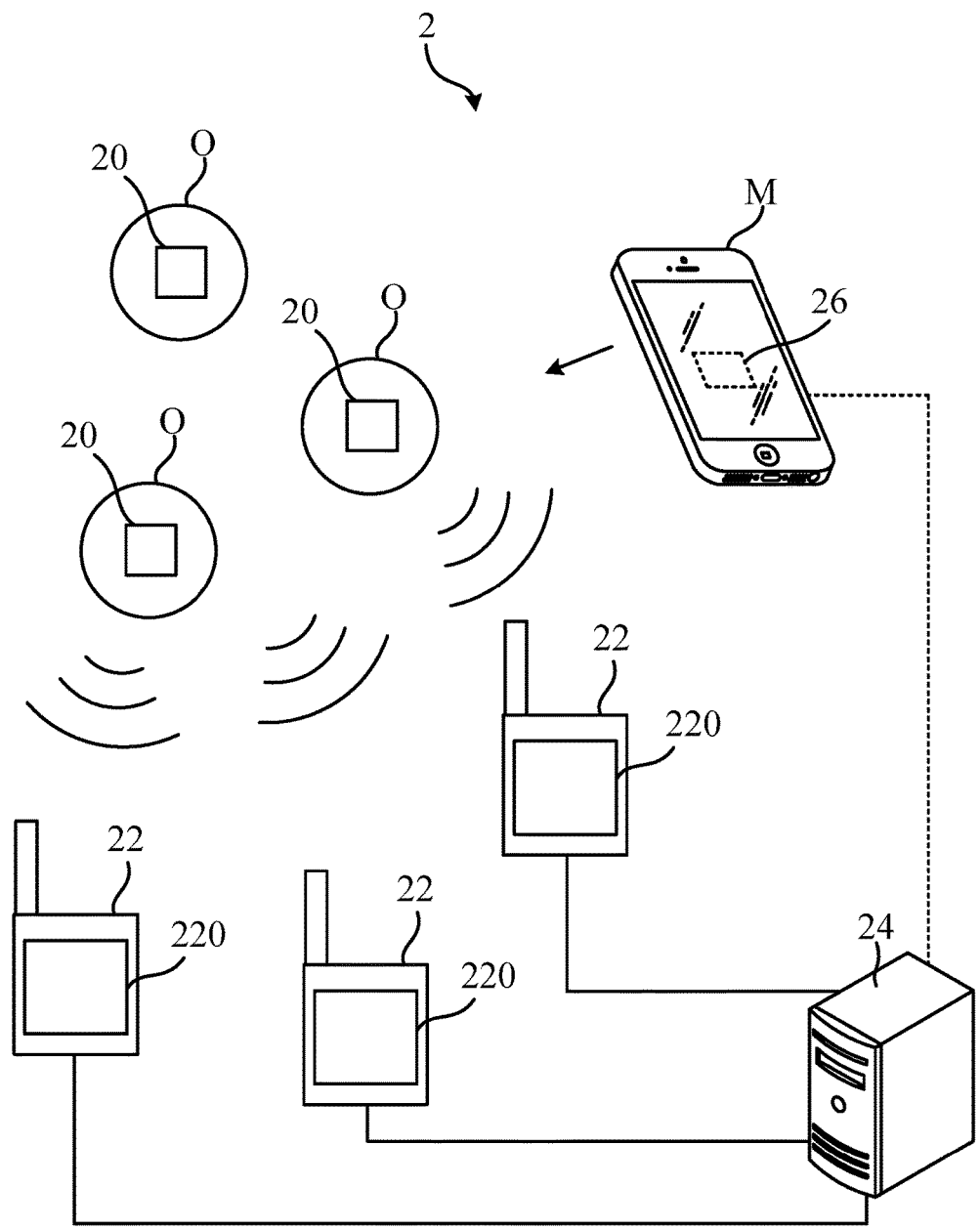
FIG. 2 shows a schematic diagram of the guiding system for positioning a target object in another embodiment of the present invention.

Please refer to FIG. 2. FIG. 2 shows a schematic diagram of the guiding system for positioning a target object 2 in another embodiment of the present invention. As shown in FIG. 2, this embodiment different from the previous embodiment in that guiding system for positioning a target object of the present embodiment comprises a plurality of wireless positioning devices 20 configured on a plurality of objects 0 located at a plurality of fixed positions. Each wireless positioning device 20 comprises a unique device identifier, and a fixed location of the object O and the unique device identifier of the corresponding wireless positioning device 20 are recorded in the positioning server 24.

The mobile device M of the present embodiment can be guided to a location area by one or more wireless positioning devices 20 are located, according to the same method of the previous embodiment. Next, when the mobile device M enters a signal range of the one or more of the wireless positioning device 20, it can receive one or more wireless broadcasting signal comprise an unique device identifier sent by the wireless positioning device 20. These identification wireless broadcasting signals comprise the unique device identifier of the corresponding wireless base station 12. The mobile device M reads one or more RSSI and sends the RSSI and the unique device identifier of the wireless positioning device 20 to the positioning server 14 via the Internet connection of the mobile device M and the positioning server 24. The positioning server 24 uses the unique device identifier of the wireless positioning device 20 and these RSSI to determine the distance between the mobile device M and the wireless positioning device 20 and calculates a current position of the mobile device M according to the positioning algorithm.

Next, the positioning server 24 can calculates one or more paths from the current position area of the mobile device M to the positioning area of the target object O, and sends the one or more paths information to the mobile device via the Bluetooth connection or the Internet connection, and the application software displays the path information on the screen of the mobile device M.

In another embodiment of the present invention, the wireless positioning device 10 and/or 20 further comprises a warning module; the warning module can be a light display, sound or vibration device. When the mobile device M closes to the wireless positioning device 10 and/or 20 with the distance that is able to establish the Internet connection, any of the mobile device M or the wireless positioning device 10 and/or 20 can initiate the establishes a wireless network connection. The alert module light, sound, or vibration effects can be triggered via the wireless network connection to alert the user of the mobile device M to the location of the wireless location device 10 and/or 20.

The paths of the embodiments described above can be implemented using Spanning Tree/Forest, shortest path method, depth-first search, width-first search, or other geographic information systems (GIS), such as Dijkstra's algorithm.

The positioning algorithm of the embodiments described above can use a single point and a distance to designate a circle as the positioning area; or two circles are designated by two points and respective distances and the shuttle type of the intersection as the positioning area. Alternatively, three points and the distance for the triangular or trilateral positioning, use the three points and the distance to designate three circles of the intersection as the positioning area. Moreover, multipoint using the cellular algorithm, multiple triangles takes its most overlapping intersection of the region to calculate the positioning area.

The relationship between the strength and distance of the wireless radio signals and the various multi-reference-point positioning algorithms of the above embodiments are discussed in reference to the algorithms in the respective academic papers. The present invention is mainly directed to the following papers, supplemented by other papers , Algorithms for Location Estimation Based on RSSI Sampling, Charalampos Papamanthou, Franco P. Preparata, and Roberto Tamassia Department of Computer Science and Center for Geometric Computing Brown University; Approximation Algorithms for Facility Location Problems, Jens Vygen, Research Institute for Discrete Mathematics, University Of Bonn Lennestrae 2,53113 Bonn, Germany; Bluetooth Indoor Positioning, Master of Computer Science, Submitted by Anja Bekkelien, Supervised by Dr. Michel Deriaz, Dr. Stephane Marchand-Maillet University of Geneva.

In summary, the guiding system for positioning a target object of the present invention does have an unprecedented innovative feature, which is neither seen in any publications nor has any similar products on the market, so the novelty should be no doubt. In addition, the unique features and functions of the present invention are far superior to those of the conventional techniques, which are progressively more advanced than the conventional techniques and are in conformity with the provisions of the Patent Law of the People's Republic of China on patent applications. The applicant has filed a patent application.

With the examples and explanations mentioned above, the features and spirits of the invention are hopefully well described. More importantly, the present invention is not limited to the embodiment described herein. Those skilled in the art will readily observe that numerous modifications and alterations of the device can be made while retaining the teachings of the invention. Accordingly, the above disclosure should be construed as limited only by the metes and bounds of the appended claims.

What is claimed is:

1. A guiding system for positioning a target object, for guiding a user of a mobile device to a position of the target object, comprising:
 a first wireless positioning device, configured on the target object for sending a first wireless broadcasting signal, wherein the first wireless broadcasting signal comprises an unique device identifier of the first wireless positioning device;
 a plurality of wireless base stations, configured around the target object, wherein the wireless base stations comprise a wireless module respectively, and the wireless modules of the wireless base stations receive the first wireless broadcasting signal respectively and measure a first wireless radio signal strength of the received first wireless broadcasting signal;
 a positioning server, recording the fixed positions of the wireless base stations, and establishing an Internet connection with the wireless base stations, wherein the positioning server receives the first received signal strength indication measured by the wireless base stations via the Internet connection, and identifies the target object that the first received signal strength indication belong to according to the unique device identifier of the first wireless broadcasting signal, and then calculates a distance between the target object and the wireless base stations according to the first received signal strength indication, and the positioning server calculates a positioning area of the target object according to the distance between the target object and the wireless base stations and the fixed positions of the wireless base stations and sends the positioning area to the mobile device via the Internet connection; and
 an application software, wherein the application software is for displaying the positioning area of the target object on the mobile device to guide the mobile device to the positioning area;
 wherein when the mobile device enters a signal range of the first wireless positioning device, the mobile device receives the first wireless broadcasting signal and calculates the distance between the mobile device and the target object according to the first wireless radio signal strength.

2. The guiding system for positioning a target object of claim 1, wherein when the mobile device enters the signal range of at least one of the wireless base stations, the mobile device establishes at least one first wireless network connections with at least one wireless base station, and the positioning server calculates a distance between the mobile device and the wireless base station corresponding to the first wireless network connection via the wireless radio signal strength of the first wireless network connection and calculates a current position of the mobile device according to the distance and the fixed positions of the wireless base stations.

3. The guiding system for positioning a target object of claim 1, wherein the wireless base stations broadcast an identification wireless broadcasting signal regularly via the corresponding wireless module respectively, and the identification wireless broadcasting signal comprises an unique identifier of the wireless base station that the wireless module belongs to; when the mobile device enters the broadcasting signal range of the wireless base stations, the mobile device receives at least one of the identification wireless broadcasting signals and measures a second wireless radio signal strength of the received identification wireless broadcasting signal, and sends the second received signal strength indication and the unique identifiers of the identification wireless broadcasting signals to the positioning server via the Internet connection, and the positioning server calculates the distance between the mobile device and the wireless base stations represented by the unique identifiers according to the second received signal strength indication, and calculates a current position of the mobile device according to the distance between the mobile device and the wireless base stations and the fixed positions of the wireless base stations.

4. The guiding system for positioning a target object of claim 1, further comprising:
a plurality of second wireless positioning devices, configured around the wireless base stations, wherein the second wireless positioning devices send a positioning wireless broadcasting signal regularly, and the positioning wireless broadcasting signal comprises an unique positioning device identifier of the second wireless positioning devices;
wherein positioning server records the unique positioning device identifiers and the corresponding fixed position of the second wireless positioning device, when the mobile device enters the signal range of the second wireless positioning devices, the mobile device receives the positioning wireless broadcasting signals, and the application software calculates a plurality of positioning received signal strength indication of the received positioning wireless broadcasting signals, and sends the positioning received signal strength indication and the corresponding unique positioning device identifiers to the positioning server via the Internet connection, and the positioning server calculates the distance between the mobile device and second wireless positioning devices represented by the unique positioning device identifiers according to the positioning received signal strength indication, and calculates a current position of the mobile device according to the distance between the mobile device and the second wireless positioning devices and the fixed positions of the second wireless positioning devices.

5. The guiding system for positioning a target object of claim 2, 3 or 4, wherein the positioning server calculates a path from the mobile device to the target object according to the current position of the mobile device and the positioning area of the target object and sends the path back to the mobile device, wherein when the mobile device receives the path, the application software displays the path on the screen of the mobile device.

6. The guiding system for positioning a target object of claim 1, wherein the first wireless positioning device further comprises a warning module, when the mobile device approaches to the first wireless positioning device with the distance that is able to establish the Internet connection, the mobile device establishes a second Internet connection with the first wireless positioning device, and the second Internet connection can be established by the mobile device or the first wireless positioning device, and the warning module is triggered to send a warning signal via second Internet connection, and the warning module can send sound or light warning.

7. The guiding system for positioning a target object of claim 1, wherein the wireless positioning device is a Bluetooth positioning device, and the first wireless broadcasting signal is a Bluetooth broadcasting signal.

8. The guiding system for positioning a target object of claim 1, wherein the wireless positioning device is a wireless local area network positioning device, and the first wireless broadcasting signal is a wireless local area network broadcasting signal.

* * * * *